US009968896B1

(12) United States Patent
Himmelsbach et al.

(10) Patent No.: US 9,968,896 B1
(45) Date of Patent: May 15, 2018

(54) STIRRING DEVICE

(71) Applicant: EKATO Rühr- und Mischtechnik GmbH, Schopfheim (DE)

(72) Inventors: Werner Himmelsbach, Rheinfelden (DE); Klaus Gezork, Schopfheim (DE)

(73) Assignee: EKATO Rühr- und Mischtechnik GmbH, Schopfheim (DE)

( * ) Notice: Subject to any disclaimer, the term of this patent is extended or adjusted under 35 U.S.C. 154(b) by 0 days. days.

(21) Appl. No.: 15/569,103

(22) PCT Filed: Apr. 28, 2016

(86) PCT No.: PCT/EP2016/059506
§ 371 (c)(1),
(2) Date: Oct. 25, 2017

(87) PCT Pub. No.: WO2016/174146
PCT Pub. Date: Nov. 3, 2016

(30) Foreign Application Priority Data

Apr. 28, 2015 (DE) ........................ 10 2015 106 512

(51) Int. Cl.
*B01F 3/10* (2006.01)
*B01F 7/00* (2006.01)
(Continued)

(52) U.S. Cl.
CPC ............ *B01F 7/00158* (2013.01); *B01F 3/10* (2013.01); *B01F 7/00275* (2013.01);
(Continued)

(58) Field of Classification Search
CPC .............. B01F 7/00158; B01F 7/00275; B01F 7/00633; B01F 3/10; B01F 7/00291; B01F 2215/0422; B01F 7/18; B01F 7/186
(Continued)

(56) References Cited

U.S. PATENT DOCUMENTS 640,369 A * 1/1900 Cross ...................... A01J 17/00 366/328.3
2,074,673 A * 3/1937 Sackett ..................... B01F 7/16 159/DIG. 3
(Continued)

FOREIGN PATENT DOCUMENTS

CH 690835 A5 2/2001
DE 2831192 C2 1/1980
(Continued)

OTHER PUBLICATIONS

Search Report dated Mar. 30, 2016 issued in corresponding DE patent application No. 10 2015 106 512.6 (and English machine translation).
(Continued)

*Primary Examiner* — Tony G Soohoo
(74) *Attorney, Agent, or Firm* — Posz Law Group, PLC

(57) ABSTRACT

A radially conveying stirring device with at least one stirring element hub configured to rotate about a rotational axis, with at least one stirring blade and with at least one carrier arm connecting the stirring blade to the stirring element hub, wherein there is at least one half-line which starts from the rotational axis, goes through a center of mass of a connecting surface area of the carrier arm to the stirring element hub and is free from intersection points with the stirring blade, and wherein the stirring blade features at least one beveling dividing the stirring blade into at least two stirring blade sections, wherein the carrier arm is embodied at least substantially L-shaped, wherein the beveling is arranged at least substantially in parallel to the rotational axis.

12 Claims, 2 Drawing Sheets

Figure 1:
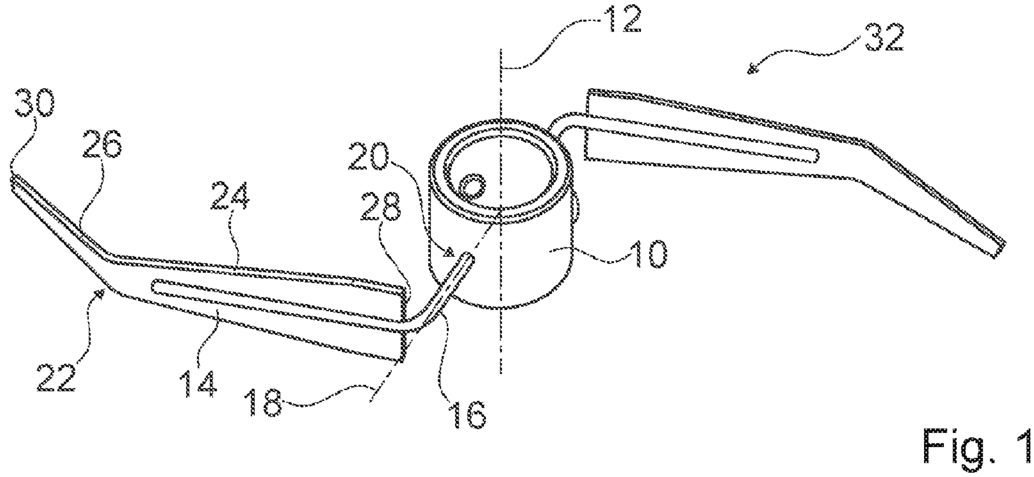

(51) Int. Cl.
*B01F 7/18* (2006.01)
*B01F 7/20* (2006.01)

(52) U.S. Cl.
CPC ...... *B01F 7/00291* (2013.01); *B01F 7/00633* (2013.01); *B01F 7/18* (2013.01); *B01F 7/20* (2013.01); *B01F 2215/0422* (2013.01)

(58) Field of Classification Search
USPC ........................................ 366/325.92, 325.93
See application file for complete search history.

(56) References Cited

U.S. PATENT DOCUMENTS

| | | | | |
|---|---|---|---|---|
| 2,579,874 | A | 12/1951 | Shaw | |
| 4,456,382 | A * | 6/1984 | Mahler, II | B01F 7/001 366/276 |
| 5,160,041 | A * | 11/1992 | Taniguchi | B01D 29/035 210/205 |
| 5,297,938 | A | 3/1994 | Von Essen et al. | |
| 5,399,014 | A * | 3/1995 | Takata | B01F 7/00291 366/262 |
| 6,334,705 | B1 * | 1/2002 | Weetman | B01F 3/04531 366/330.1 |
| 7,368,283 | B1 * | 5/2008 | Ito | C12C 11/003 366/129 |
| 9,248,420 | B2 * | 2/2016 | Rawlings | B01F 7/22 |
| 9,272,251 | B2 * | 3/2016 | Jones | B01F 7/00275 |
| 9,854,813 | B2 * | 1/2018 | Chiaramello | A21C 1/1405 |
| 2002/0031048 | A1 | 3/2002 | Lipp | |
| 2003/0007417 | A1 * | 1/2003 | Miyata | B01F 7/00016 366/247 |
| 2006/0104874 | A1 | 5/2006 | Gebhart et al. | |
| 2016/0270412 | A1 * | 9/2016 | Andersson | A21C 1/02 |

FOREIGN PATENT DOCUMENTS

| | | | |
|---|---|---|---|
| DE | 3143287 | A1 | 6/1982 |
| DE | 29502443 | U1 | 3/1995 |
| DE | 100 23 698 | A1 | 11/2001 |
| DE | 103 10 091 | A1 | 9/2004 |
| DE | 20 2011 052 408 | U1 | 3/2012 |
| EP | 3 031 519 | A1 | 6/2016 |
| FR | 2346977 | A2 | 11/1977 |
| JP | 2015-33658 | A | 2/2015 |

OTHER PUBLICATIONS

Office Action dated Mar. 30, 2016 issued in corresponding DE patent application No. 10 2015 106 512.6 (and English machine translation).

Office Action dated Nov. 6, 2017 issued in corresponding DE patent application No. 10 2015 106 512.6 (and English machine translation).

International Search Report and Written Opinion of the International Searching Authority dated Jul. 29, 2016 issued in corresponding International Patent Application No. PCT/EP2016/059506.

Telephone conference with Examiner dated Jun. 29, 2017 issued in corresponding International Patent Application No. PCT/EP2016/059506.

International Preliminary Report on Patentability dated Nov. 2, 2017 issued in corresponding International Patent Application No. PCT/EP2016/059506.

* cited by examiner

STIRRING DEVICE

CROSS REFERENCE TO RELATED APPLICATIONS

This application is a U.S. national stage application of PCT/EP2016/059506 filed on Apr. 28, 2016, which claims priority to German Patent Application No. DE 10 2015 106 512.6 filed on Apr. 28, 2015, the contents of which are incorporated herein by reference.

STATE OF THE ART

The invention relates to a stirring device according to the preamble of claim 1.

Radially conveying stirring elements for mixing viscous media have already been proposed, with a stirring element hub configured to rotate about a rotational axis, with a plurality of stirring blades and with carrier arms connecting the stirring blades to the stirring element hub.

The document DE 295 02443 U1 shows a mixer with a mixing trough for receiving a material to be mixed, comprising at least one mixing tool arranged on a rotor and protruding into the mixing trough from above, the rotor comprising a clamping set and the mixing tool being connectable to the rotor by means of the clamping set.

The document DE 103 10 091 A1 shows a device for carrying out chemical and physical processes, in which flowable substances are mixed with one another, consisting of a vertical cylindrical container with inlets and outlets as well as a central shaft and radial stirring blades which are arranged on the central shaft and extend to a proximity of a wall, wherein the stirring blades are implemented curved, viewed in a circumferential direction, wherein the stirring blades are arranged in pairs, one above the other one, and combined in groups to form stirring elements, and wherein the blades of the one element of the group are curved to be radially concave and the blades of the other element are curved to be radially convex.

The document DE 28 31 192 C2 shows a method for thoroughly mixing a mainly liquid reaction mixture in a container by means of introducing a mixing energy implemented by two axial stirrers which are arranged in an agitator container offset to each other in a vertical and in a horizontal direction wherein, by way of differing rotation speeds of the axial stirrers and/or differing geometries of the stirring elements of the two axial stirrers, in both stirring zones equivalent delivery quantities are generated in opposite-oriented axial delivery directions, with opposite rotational directions of the axial stirrers for the purpose of achieving a free turbulence on a connecting line between the places in which the mixing energy is introduced.

The document DE 31 43 287 C2 shows an agitator for grape mash, comprising a circulating shaft and leaf-shaped mixing blades, which have at least one first section that is inclined obliquely counter to the circulating direction including an angle therewith, wherein, viewed in at least one circulating direction, a second blade section, which is inclined in the same direction by a pitch angle smaller than the pitch angle of the first section, abuts on the first section.

The document DE 100 23 698 A1 shows a mixing and dissolving machine with an upwards-conveying mixing helix circulating about a vertical rotational axis, wherein a second mixing helix is arranged in an axial direction downstream of the above-mentioned first mixing helix and a transition zone extends in an axial direction between the mixing helixes.

The document FR 2 346 977 A2 shows a mixing trough with a mixer that is arranged centrally on a top side of the mixing trough and comprises a drive shaft with curved stirring blades, which are directly fixated to the drive shaft, and protrudes into an inner space of the mixing trough from above.

The objective of the invention is in particular providing a stirring device with improved characteristics regarding a mixing performance. The objective is achieved by the features of patent claim 1 while advantageous implementations and further developments of the invention may be gathered from the subclaims.

Advantages of the Invention

The invention is directed to a radially conveying stirring device, in particular for mixing middle-to-highly viscous media, with at least one stirring element hub configured to rotate about a rotational axis, with at least one stirring blade and with at least one carrier arm connecting the stirring blade to the stirring element hub, wherein there is at least one half-line which starts from the rotational axis, goes through a center of mass of a connecting surface area of the carrier arm to the stirring element hub and is free from intersection points with the stirring blade, and wherein the stirring blade features at least one beveling dividing the stirring blade into at least two stirring blade sections, wherein the carrier arm is embodied at least substantially L-shaped, wherein the beveling is arranged at least substantially in parallel to the rotational axis. Advantageously the stirring device comprises a plurality of stirring blades, which are preferably at least substantially identical to each other, in particular at least two, preferentially precisely two stirring blades, and/or comprises a plurality of carrier arms, which are preferably at least substantially identical to each other, in particular at least two, preferentially exactly two carrier arms. The term "at least substantially identical to each other" is herein in particular to mean identical to each other except for manufacturing tolerances.

By a "stirring device" is in particular at least a portion and/or an assembly group, in particular sub-assembly group, of a stirring element, in particular of an axially conveying stirring element and advantageously of a radially conveying stirring element to be understood. In particular, the stirring device may as well comprise the entire stirring element, in particular the entire axially conveying stirring element and advantageously the entire radially conveying element. In particular, the stirring element is herein different from a propeller and/or fan wheel, in particular for the conveyance of air. The stirring device is preferably configured to generate, in at least one operating state, a plug flow. Furthermore, a "medium of middle-to-high viscosity" is in particular to be understood as an in particular one-phase and/or multi-phase medium, in particular with at least one solid phase, at least one liquid phase and/or at least one gaseous phase, which in particular has rheologically significantly non-Newton characteristics, e.g. shear thinning media and/or media with yield points. A viscosity and/or an apparent viscosity of the middle-to-highly viscous medium, in particular at the stirring element, is herein, in particular at shear rates of 10/s, in particular if considered without gaseous portions, between 0.5 Pa*s (pascal-seconds) and 200 Pa*s, preferably between 1 P*s and 100 P*s and especially preferentially between 2 P*s and 30 P*s. The middle-to-highly viscous medium preferably comprises biomass. In particular, the middle-to-highly viscous medium results in a Reynolds number in a range between 10 and 10 000, advantageously between 15 and 8 000, preferably between 25 and 5 000 and especially preferentially between 30 and 1 000. In particular, the stirring device is implemented, in particular by its specific shape and/or specific material, for processing this kind of middle-to-highly viscous media.

The stirring blade is in particular embodied at least substantially plate-like and especially preferentially in a one-part implementation. In particular when viewed perpendicularly to a main extension plane of the stirring blade, the stirring blade may herein have any contour and/or shape deemed expedient by someone skilled in the art, e.g. at least substantially rectangular, triangular and/or trapezoid-shaped. In this context, a "main extension plane" of an object is in particular to be understood as a plane which extends in parallel to a largest lateral surface of a smallest imaginary rectangular cuboid just still completely enclosing the object, and which in particular extends through a center point, in particular a geometrical center point, of the rectangular cuboid. By an "at least substantially" rectangular, triangular and/or trapezoid-shaped object is in particular an object to be understood which differs from a rectangular, triangular and/or trapezoid-shaped reference object by a volume portion of maximally 40%, advantageously no more than 30%, preferably no more than 20% and especially preferentially maximally 10%. Furthermore, "embodied in a one-part implementation" is in particular to mean connected at least by substance-to-substance bond. The substance-to-substance bond may herein be established, for example, by an adhesive process, by a welding process, by a soldering process and/or by any other process that is deemed expedient by someone skilled in the art. Advantageously, however, "embodied in a one-part implementation" is to mean formed in one piece. Said one piece is preferably produced of a single blank and/or cast. The stirring element hub is in particular configured to accommodate in at least one operating state at least one stirring shaft and/or to be fixated to the at least one stirring shaft. The at least one stirring shaft herein in particular defines the rotational axis. Advantageously the rotational axis is arranged in parallel to a main extension direction of the stirring shaft. Especially preferentially the rotational axis herein extends, in particular viewed perpendicularly to a main extension plane of the stirring shaft, through a center point, in particular a geometrical center point, of the stirring shaft. By a "main extension direction" of an object is herein in particular a direction to be understood which is parallel to a longest edge of a smallest geometrical rectangular cuboid which encloses the object just still completely. The stirring element hub is advantageously embodied in a one-part implementation. The at least one stirring element hub is herein in particular configured for a fixation of the stirring blade. Preferably the stirring blade is in a mounted state arranged on the stirring element hub in such a way that the main extension plane of the stirring blade and the rotational axis are oriented at least substantially in parallel to one another. "At least substantially in parallel" is herein in particular to mean an orientation of at least one direction with respect to at least one reference direction, in particular in a plane, wherein the direction differs from the reference direction in particular by less than 8°, advantageously by less than 5° and particularly advantageously by less than 2°. "Configured" is in particular to mean specifically designed and/or equipped. By an object being configured for a certain function is in particular to be understood that the object fulfills and/or implements said certain function in at least one application state and/or operating state. The carrier arm may be embodied as any connecting element that is deemed expedient by someone skilled in the art, in particular as a holding element, e.g. a carrier plate. Preferably however, the carrier arm is embodied as a rod-shaped bar. Especially preferentially the carrier arm is embodied in a one-part implementation. The carrier arm is herein in particular free of sharp edges. Moreover a "connecting surface area" is in particular to be understood as a proximity surface area and/or as a contact surface, in which the carrier arm is connected to the stirring element hub. In this context, a "proximity surface area" is in particular to mean a spatial surface area embodied of points each of which has a distance from a reference point that is no more than 5%, advantageously no more than 2%, preferably maximally 0.5% and especially preferentially no more than 0.1% of an entire stirring element diameter.

In particular, the stirring blade, the stirring element hub and/or the carrier arm may be made at least partly, preferably at least to a large extent and especially preferentially completely of an alloy and/or a metal, in particular stainless steel, duplex steel and/or titanium. Preferentially the stirring blade, the stirring element hub and/or the carrier arm are made of the same material. The term "at least to a large extent" is herein in particular to mean by at least 50%, preferably by at least 70% and especially preferentially by at least 90%. By this implementation a stirring device may be provided which has improved characteristics regarding a mixing performance. It is herein possible to selectively influence a conveying performance in a radial direction and to minimize an axial material exchange between respective stirring steps, thus advantageously achieving a close-range dwell time distribution. Herein the middle-to-highly viscous medium may also be mixed advantageously in a proximity of a container wall and dead zones are effectively avoidable. Moreover, in particular a constant power input, in particular in terms of time and/or space, into the middle-to-highly viscous medium is achievable. It is furthermore possible to provide a structurally simple and advantageously cost-efficient stirring device. In addition, by an optimized geometry of the stirring device with an advantageously reduced power coefficient, operating periods, in particular in case of stirring and/or mixing middle-to-highly viscous media, in particular for disintegrating a biomass, may be reduced and costs may be advantageously cut down.

Viewed in a direction of the rotational axis, a main extension direction of the stirring blade includes an angle with the half-line that is between 45° and 135°, preferably between 55° and 125° and especially preferentially between 70° and 110°. This advantageously allows generating an at least substantially radial flow.

The carrier arm could, for example, be embodied at least substantially straight and/or curved, in particular arc-shaped and/or S-shaped. Advantageously however the carrier arm is embodied at least substantially L-shaped, thus allowing an advantageous fluid flow, in particular of a middle-to-highly viscous medium, in particular in a proximity of the stirring shaft, to be generated.

If the carrier arm is arranged at least substantially at mid-level of the stirring blade, in particular centrally on the stirring blade, a fluid flow may be further optimized. By the term "at least substantially at mid-level" is in particular to be understood that a distance of the carrier arm from a central connection point of the stirring blade is equivalent to maximally 0.5%, preferably maximally 0.1% and especially preferentially no more than 0.05% of an entire stirring element diameter.

In an implementation of the invention it is proposed that the stirring blade advantageously comprises n bevelings dividing the stirring blade into at least two, advantageously n+1, stirring blade sections. In this case n is in particular equivalent to a whole number between 1 and 25, advantageously between 1 and 15, preferably between 1 and 10, and especially preferentially between 1 and 5. A bevel angle, in particular an inner angle, of the beveling is herein in particular between 91° and 175°, preferably between 105° and 165° and especially preferentially between 130° and 160°. In this way advantageously a flexibility is enhanceable.

The beveling, in particular a bending axis of the beveling, is arranged at least substantially in parallel to the rotational axis. This advantageously allows adapting a conveying performance in a radial direction to a variety of requirements.

Furthermore it is proposed that a main extension length of the stirring blade sections decreases from a stirring blade inner edge of the stirring blade towards a stirring blade outer edge of the stirring blade. Advantageously an innermost stirring blade section herein has a main extension length between 2% and 45%, advantageously between 10% and 40%, preferably between 20% and 35% and especially preferentially between 27% and 31% of an entire stirring element diameter. In this context, by a "main extension length" of an object in particular a length, in particular of the object, is to be understood which is parallel to a longest edge of a smallest geometrical rectangular cuboid which just still completely encloses the object. By a "stirring blade inner edge" of a stirring blade is furthermore in particular a stirring blade edge, in particular a lateral surface, of the stirring blade to be understood, which faces towards the rotational axis and/or the stirring element hub, in particular in a mounted state and/or in at least one operating state. By a "stirring blade outer edge" of the stirring blade is in particular a stirring blade edge, in particular a lateral surface, of the stirring blade to be understood, which faces away from the rotational axis and/or the stirring element hub, in particular in a mounted state and/or in at least one operating state. This in particular allows optimizing a mixing performance as well as individually adapting a radial as well as an axial conveying performance.

In a preferred implementation of the invention it is proposed that a blade height of the stirring blade decreases towards a stirring blade outer edge of the stirring blade. Advantageously the blade height herein changes strictly monotonously, advantageously linearly, at least in a middle region of the stirring blade, in particular with respect to a main extension direction of the stirring blade, and/or in a peripheral region of the stirring blade, in particular with respect to a main extension direction of the stirring blade. Especially preferentially the blade height is constant at least in an inner region of the stirring blade, in particular with respect to a main extension direction of the stirring blade, as a result of which in particular inserting or threading of the stirring element into a manhole may be simplified. Alternatively it is conceivable that, in the inner region of the stirring blade, the blade height changes strictly monotonously, advantageously linearly, in particular with respect to a main extension direction of the stirring blade. A "blade height" of the stirring blade is in particular to mean an extension of the stirring blade which is arranged at least substantially in parallel to the rotational axis, in particular in a mounted state and/or in at least one operating state. Furthermore an "inner region" of the stirring blade is in particular to mean a region of the stirring blade which faces towards the rotational axis and/or towards the stirring element hub, in particular in a mounted state and/or in at least one operating state. An "outer region" of the stirring blade is in particular to mean a region of the stirring blade which faces away from the rotational axis and/or from the stirring element hub, in particular in a mounted state and/or in at least one operating state. A "central region" of the stirring blade is in particular to mean a region of the stirring blade which directly abuts on the inner region and the outer region, in particular in a mounted state and/or in at least one operating state. This in particular allows improving in particular a homogeneity of a power input, in terms of time and/or space, into the middle-to-highly viscous medium as well as improving a flow performance, in particular radial flow performance, along the stirring blade.

An especially advantageous flow performance is achievable if, in a proximity of a stirring blade inner edge of the stirring blade, a blade height of the stirring blade is equivalent to a value between 1% and 30%, preferably between 3% and 20% and especially preferentially between 5% and 15% of an entire stirring element diameter. By a "proximity" is in particular a spatial region to be understood which is implemented by points each having a distance of maximally 10%, advantageously no more than 5%, preferably maximally 2% and especially preferentially no more than 1% of an entire stirring element diameter from a reference point and/or a reference component.

If, in a proximity of a stirring blade outer edge of the stirring blade, a blade height of the stirring blade is equivalent to a value between 0.5% and 15% and preferably between 1% and 5% of an entire stirring element diameter, in particular an optimized power input is achievable.

In a particularly preferred implementation of the invention it is proposed that the stirring element hub, the carrier arm and the stirring blade are embodied at least partly in a one-part implementation with one another, and are advantageously embodied in a one-part implementation. This in particular allows increasing a stability of the stirring device. Moreover an endurance strength and/or a service life may be increased, as a result of which in particular maintenance and exchange intervals may be reduced and downtimes may be substantially shortened.

Furthermore a stirring system is proposed, with at least one, in particular vertically arranged, container, in particular pressure container, in particular for receiving middle-to-highly viscous media, and with at least two stirring elements each having at least one stirring element device, which are arranged in the container. The stirring system my herein in particular comprise at least one stirring shaft. The stirring elements are herein advantageously arranged on the stirring shaft, which is in particular a shared stirring shaft, and are in particular arranged above one another in a vertical direction. Advantageously the stirring elements implement at least two stirring steps. Especially preferentially each stirring element implements at least one stirring step, advantageously precisely one stirring step. In particular, each of the stirring elements and/or each stirring step defines at least one compartment, in particular a mixing space, of the container. In particular in case of highly viscous media, it is also possible that of the stirring elements and/or each stirring step implements at least two, advantageously precisely two compartments. Preferably a rotational axis is herein arranged in particular in parallel to an, in particular vertically-arranged, container axis and/or in parallel to the container. Preferentially it is also possible that the stirring system comprises a plurality of stirring elements, in particular at least three, at least four and/or at least five stirring elements, which may be arranged and/or fixated, in particular on top of each other, in particular on a stirring shaft, in particular on a shared stirring shaft. The stirring system may further comprise in particular at least one middle-to-highly viscous medium, which is in particular arranged in the container. Preferentially the middle-to-highly viscous medium flows through the container, advantageously in a continuous manner, in an axial direction, in particular from top to bottom, in particular due to an external and/or externally applied flow component. Moreover the stirring system is in particular configured to generate, in at least one operating state, a plug flow. Advantageously the stirring system is configured to generate an at least substantially radial flow, in particular to suppress and/or prevent an, in particular additional, axial flow, in particular with respect to the rotational axis and/or container axis, said axial flow being in particular generated by the stirring elements. By an object being configured to "at least substantially suppress an axial flow" is in particular to be understood, in this context, that the object is configured to influence a flow performance in such a way that an, in particular additional, axial flow induced by the object is equivalent to maximally 30%, advantageously no more than 20%, preferentially no more than 10% and particularly preferably no more than 5% of a total and/or effective axial flow. This allows providing a long-lived stirring system that is optimized, in particular regarding a mixing performance, wherein a conveying performance in a radial direction may be selectively influenced and an axial material exchange between respective stirring steps and/or compartments is at least partly and preferably at least to a large extent suppressible, as a result of which a close-range dwell time distribution is advantageously achievable in the respective stirring steps and/or compartments. Moreover the specific implementation of the stirring device allows providing a stirring element which is advantageously adapted to a geometry of the container, as a result of which in particular an approximately optimum plug flow is achievable.

Beyond this the invention comprises a method for operating a stirring system, wherein a middle-to-highly viscous medium arranged in a container is mixed in such a way that an, in particular additional, axial flow, which is in particular generated by stirring elements, is at least substantially suppressed, and in particular an at least substantially radial flow is generated. Advantageously the stirring system may comprise the container, in particular pressure container, which is in particular arranged vertically and is in particular intended for accommodating middle-to-highly viscous media, at least two stirring elements arranged in the container, at least one stirring shaft and/or at least one middle-to-highly viscous medium, which is in particular arranged in the container. Preferably the stirring system may also comprise a plurality of stirring elements, in particular at least three, at least four and/or at least five stirring elements, which may be arranged and/or fixated in particular on a stirring shaft, in particular a shared stirring shaft, in particular one on top of the other one. Especially preferentially the stirring system is equivalent to the stirring system mentioned above, wherein the at least two stirring elements arranged in the container each comprise at least one stirring device, in particular radially conveying stirring device, in particular for mixing middle-to-highly viscous media, with at least one stirring element hub that is configured to rotate about a rotational axis, with at least one stirring blade and with at least one carrier arm connecting the stirring blade to the stirring element hub, wherein there is at least one half-line starting from the rotational axis, which intersects with a center of mass of a connecting surface area of the carrier arm with respect to the stirring element hub and which is free from intersection points with the stirring blade. This allows advantageously improving a mixing performance.

The at least two stirring elements advantageously implement at least two stirring steps, and a plug flow is generated within the container, wherein the middle-to-highly viscous medium is in particular mixed in such a way that a middle dwell time, at least in the respective stirring steps, is at least substantially identical, in particular except for operation tolerances. In this way in particular an optimized mixing performance is achievable, wherein advantageously an at least substantially radial flow is generated and in particular an axial flow, which is in particular initiated by the stirring elements, may be at least substantially prevented. Furthermore in particular an axial product exchange between the compartments is at least partially suppressible.

The stirring device is herein not to be restricted to the application and implementation form described above. In particular, for fulfilling a functionality herein described, the stirring device may comprise a number of respective elements, structural components and units that differs from a number that is mentioned herein.

DRAWINGS

Further advantages will become apparent from the following description of the drawings. In the drawings an exemplary embodiment of the invention is shown. The drawings, the description and the claims contain a plurality of features in combination. Someone skilled in the art will purposefully also consider the features separately and will find further expedient combinations.

Figure 2:
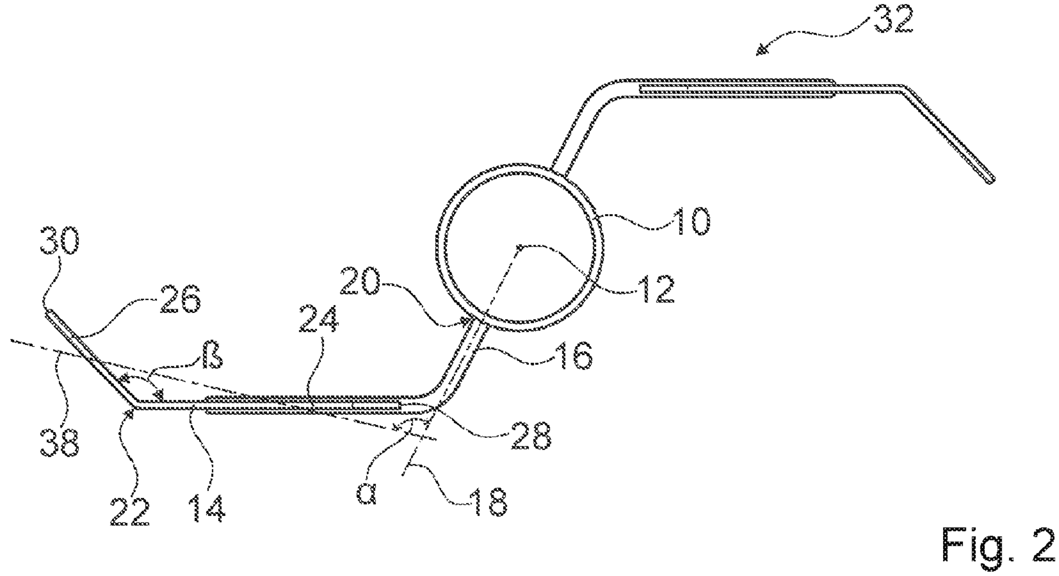
Figure 3:
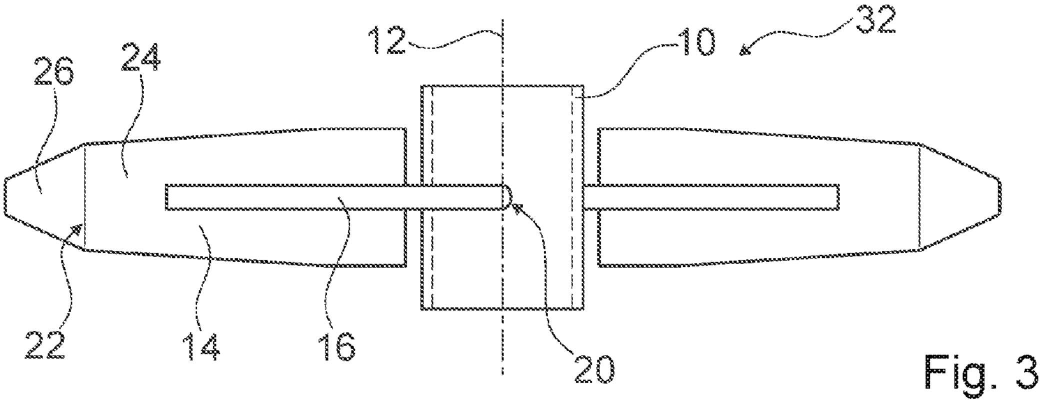
Figure 4:
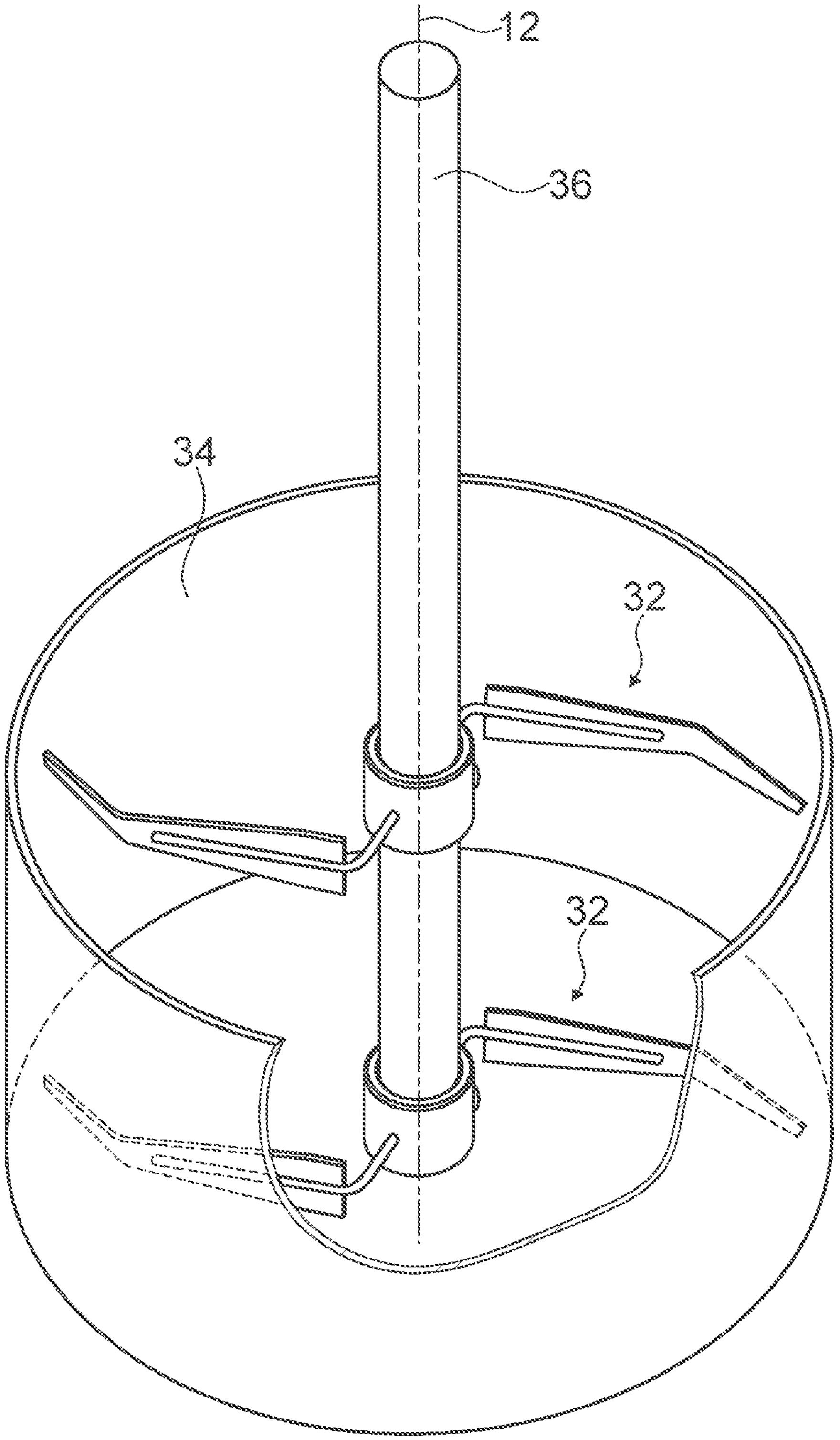

It is shown in:

FIG. 1 a stirring element embodied as a radial stirrer, with a stirring device, in a perspective presentation, FIG. 2 the stirring element when viewed in a direction of a rotational axis, FIG. 3 the stirring element in a lateral view, and FIG. 4 a stirring system with a container and with a plurality of stirring elements according to FIGS. 1 to 3.

DESCRIPTION OF THE EXEMPLARY EMBODIMENTS

FIGS. 1 to 3 show a stirring element 32 embodied as a radial stirrer, in a fully mounted state in a perspective view (cf. FIG. 1), in a plan view (cf. FIG. 2) and in a lateral view (cf. FIG. 3). The stirring element 32 is in the present case embodied in a one-part implementation. Alternatively it is conceivable to implement a stirring element in a multi-part implementation, e.g. by means of at least one screw connection. The stirring element 32 comprises a stirring device, in particular a radially conveying stirring device. The stirring device is configured for mixing highly viscous media. In the present case the stirring device is configured for a disintegration of biomass and in particular for a usage in the production of ethanol.

The stirring device comprises a stirring element hub 10. The stirring element hub 10 is in the present case embodied in a one-part implementation. The stirring element hub 10 is completely made of stainless steel. Alternatively however it is also conceivable to implement a stirring element hub in a multi-part implementation. In that case the stirring element hub could be embodied, for example, in a two-part and/or four-part implementation, preferably with identical stirring element hub components. The stirring element hub 10 is configured to accommodate, in at least one operating state, a stirring shaft 36 (cf. in particular FIG. 4). The stirring element hub 10 is configured to be fixated to the stirring shaft 36. An orientation of the stirring shaft 36 defines a rotational axis 12 of the stirring device. The stirring element hub 10 is herein configured to rotate about the rotational axis 12. The stirring element hub 10 is in the present case configured for rotating about the rotational axis 12 in both directions.

The stirring device further comprises a plurality of stirring blades 14. In the present case the stirring device comprises two stirring blades 14. For the sake of better overview, in FIGS. 1 to 3 only one of the stirring blades has been given reference numerals. The stirring blades 14 are embodied at least substantially identical to one another. The stirring blades 14 are embodied at least substantially plate-shaped. The stirring blades 14 have an at least substantially constant material thickness. The stirring blades 14 are embodied in one-part implementations. The stirring blades 14 are completely made of stainless steel. Viewed perpendicularly to a main extension plane of the respective stirring blade 14, the stirring blades 14 are embodied at least substantially trapezoid-shaped (cf. in particular FIG. 3). The stirring blades 14 each comprise a stirring blade inner edge 28 and a stirring blade outer edge 30. Furthermore the stirring blades 14 are arranged at approximately 180° angular distances with respect to each other. Alternatively a stirring device may also comprise three stirring blades which are arranged in particular at 120° angular distances with respect to each other, and/or four stirring blades which are arranged in particular at 90° angular distances with respect to each other. Alternatively it is also conceivable that a stirring device comprises more than four stirring blades, e.g. at least five, at least six, at least eight and/or at least ten stirring blades. The stirring blades 14 are arranged spaced apart from the stirring element hub 10. In a mounted state, the stirring blades 14 are arranged on the stirring element hub 10 in such a way that the main extension plane of the respective stirring blade 14 and the rotational axis 12 are oriented at least substantially in parallel to one another. In the present case the stirring blades 14 are fixated to the stirring element hub 10 indirectly.

For this purpose the stirring device comprises a plurality of carrier arms 16. In the present case the stirring device comprises two carrier arms 16. Each carrier arm 16 is allocated to one of the stirring blades 14. For the sake of overview, in FIGS. 1 to 3 only one of the carrier arms 16 is given reference numerals. The carrier arms 16 are embodied at least substantially identically to each other. The carrier arms 16 are respectively embodied in a one-part implementation. The carrier arms 16 are completely made of stainless steel. The carrier arms 16 are each embodied as a rod-shaped bar. The carrier arms 16 are implemented at least substantially cylinder-shaped, in particular circle-cylinder-shaped. In the present case the carrier arms 16 are implemented at least substantially L-shaped, viewed perpendicularly to the rotational axis 12.

The carrier arms 16 are configured to connect the stirring blades 14 to the stirring element hub 10. For this purpose the carrier arms 16 are fixated, on the one hand, to the stirring element hub 10 and, on the other hand, to one of the stirring blades 14. In the present case the carrier arms 16 are embodied in a one-part implementation with the stirring element hub 10. A contact surface between the respective carrier arm 16 and the stirring element hub 10 corresponds to a connecting surface area 20 of the carrier arm 16 to the stirring element hub 10. An angle between the carrier arms 16 and the rotational axis 12 is in the present case equivalent to 90°. Alternatively it is however also conceivable that at least one carrier arm 16 includes an angle with a rotational axis that differs from 90°. The carrier arms 16 are furthermore embodied in a one-part implementation with the respective stirring blade 14. The carrier arms 16 are arranged at mid-level of the respective stirring blade 14, in particular centrally on a respective stirring blade 14. The carrier arms 16 run, at least to a large extent, in parallel to a main extension direction 38 of the respective stirring blade 14. The carrier arms 16 run, at least to a large extent, along a main extension length of the stirring blade 14. A material thickness of the carrier arms 16 and/or a diameter of the carrier arms 16 is herein at least substantially constant. Alternatively it is conceivable that a material thickness of carrier arms and/or a diameter of the carrier arms decreases towards a stirring blade outer edge. Moreover any further kinds of fixation, deemed expedient by someone skilled in the art, are also conceivable. It is in particular conceivable that in a mounted state at least one carrier arm is connected to a stirring blade and/or to a stirring element hub at least partly and/or completely by a force-fit and/or form-fit connection, e.g. in particular via a screw connection and/or a plug connection. It is further conceivable to implement a stirring element hub, at least one carrier arm and/or at least one stirring blade of a different material that is deemed expedient by someone skilled in the art, e.g. stainless steel.

In the following only one exemplary embodiment of one of the stirring blades 14 and the carrier arm 16 allocated to said stirring blade 14 will be described, wherein the description below may be applied to the other stirring blade, which is in particular embodied at least substantially identically, and to the other carrier arm, which is in particular embodied at least substantially identically.

In the present case there exists a half-line 18, which starts from the rotational axis 12, goes through a center of mass of the connecting surface area 20 of the carrier arm 16 and is free from intersection points with the stirring blade 14. Furthermore the main extension direction 38 of the stirring blade 14 includes an angle $\alpha$ of approximately 105° with the half-line 18.

The stirring blade 14 further comprises a beveling 22. The beveling 22 is arranged in parallel to the rotational axis 12. The beveling 22 is arranged on a side of the stirring blade 14 that faces towards the stirring blade outer edge 30. A bevel angle $\beta$ of the beveling 22 is approximately 150°. The beveling 22 divides the stirring blade 14 into two stirring blade sections 24, 26. A main extension length of the stirring blade sections 24, 26 decreases from the stirring blade inner edge 28 towards the stirring blade outer edge 30. An inner stirring blade section 24 of the stirring blade sections 24, 26 has a main extension length of approximately 29% of an entire stirring element diameter. An outer stirring blade section 26 of the stirring blade sections 24, 26 has a main extension length of approximately 10% of an entire stirring element diameter. Alternatively it is conceivable that a stirring blade comprises a plurality of bevelings, e.g. at least two and/or at least three bevelings.

Beyond this a blade height of the stirring blade 14, in particular an extension of the stirring blade 14 towards the rotational axis 12, decreases towards the stirring blade outer edge 30. In an inner region of the stirring blade 14, the blade height of the stirring blade 14 is constant. In a middle region of the stirring blade 14, the blade height of the stirring blade 14 changes linearly. In an outer region of the stirring blade 14, the blade height of the stirring blade 14 changes linearly. In the present case a gradient of a change in the blade height of the stirring blade 14 in the middle region is at least substantially equivalent to a gradient of a change in the blade height of the stirring blade 14 in the outer region. A blade height of the stirring blade 14 in a proximity area of the stirring blade inner edge 28 is in the present case approximately equivalent to 8% of an entire stirring element diameter. Furthermore a blade height of the stirring blade 14 in a proximity of the stirring blade outer edge 30 is approximately equivalent to 2% of an entire stirring element diameter. Alternatively it is conceivable that a blade height of a stirring blade changes linearly over an entire longitudinal extension of the stirring blade.

FIG. 4 shows an exemplary stirring system, which is in particular continuously operated and continuously flowed through, with a vertically arranged container 34 and with a plurality of stirring elements 32 arranged in the container 34. In the present case at least two stirring elements 32 are arranged in the container 34. The stirring elements 32 are embodied at least substantially identically to each other. The stirring elements 32 correspond to the stirring element 32 of FIGS. 1 to 3. Each of the stirring elements 32 thus comprises a stirring device according to the invention. The stirring elements 32 are embodied as multi-step stirrers. The stirring elements 32 are arranged on a shared stirring shaft 36. The stirring elements 32 are arranged on the stirring shaft 36 above one another. Each of the stirring elements 32 herein implements a stirring step. Moreover each of the stirring elements 32 and/or each stirring step defines at least one compartment, in particular a mixing space, of the container 34. The stirring elements 32 are arranged in the container 34 in such a way that the rotational axis 12 is arranged in parallel to a vertically-arranged container axis. Alternatively it is conceivable to arrange a differing number of and/or differently arranged and/or differently embodied stirring elements, which may in particular comprise a stirring device according to the invention, in a container. It is also conceivable to arrange stirring elements in a container in such a way that they are offset to each other, e.g. offset to each other by 30°, 45°, 60° and/or 90°, and/or in such a way that they are mirror-symmetrical to each other.

In an operating state, a middle-to-highly viscous medium (not shown) is arranged in the container 34. The middle-to-highly viscous medium comprises in the present case a biomass, in particular implemented as a phase. The middle-to-highly viscous medium flows through the container 34 continuously from top to bottom. A Reynolds number is herein between 30 and 500.

The stirring system is configured to generate a plug flow. The stirring system and in particular the respective stirring elements 32 is/are configured to generate an at least substantially radial flow and to at least substantially prevent an axial flow which is generated by the stirring elements 32 and which is in particular an additional axial flow. An axial flow component of the middle-to-highly viscous medium and/or a product exchange between the respective compartments herein at least substantially exclusively results from an externally applied continuous flow-through through the container 34, while a product exchange between the respective compartments, which is initiated by the stirring elements 32, is at least substantially avoided. Herein a structural implementation and/or a design of the stirring elements 32 significantly contributes to a stabilization of the respective stirring steps and/or compartments.

Beyond this, the middle-to-highly viscous medium is mixed, by means of the stirring system, in such a way that a middle dwell time $\tau$, in particular of the particles and/or of the volume elements of the middle-to-highly viscous medium, in the respective stirring steps and/or in the respective compartments is at least substantially identical. The middle dwell time $\tau$ is generally obtained by the following equation:

$$\tau = V/Q \tag{1}$$

Herein V corresponds to a volume of the respective compartment and Q corresponds to a volume flow, which is advantageously induced externally and by which the container 34 is flown through. The middle dwell time $\tau$ in the respective stirring steps is herein longer, advantageously significantly longer, than a mixing time $\theta$ of the stirring step. In the present case the middle dwell time $\tau$ is at least $1*\theta$, advantageously at least $3*\theta$ and especially preferentially at least $6*\theta$. Advantageously the middle dwell time $\tau$ herein is maximally $30*\theta$, preferably no more than $20*\theta$ and particularly preferably no more than $10*\theta$.

By means of such a kind of stirrer system, an advantageous mixing performance is achievable, wherein in particular an axial product exchange between the compartments is reducible and an implementation of a close dwell time distribution range is enhanceable.

The invention claimed is:

1. A radially conveying stirring device with at least one stirring element hub configured to rotate about a rotational axis, with at least one stirring blade and with at least one carrier arm connecting the stirring blade to the stirring element hub, wherein there is at least one half-line which starts from the rotational axis, goes through a center of mass of a connecting surface area of the carrier arm to the stirring element hub and is free from intersection points with the stirring blade, and wherein the stirring blade features at least one beveling dividing the stirring blade into at least two stirring blade sections, wherein the carrier arm is embodied at least substantially L-shaped, wherein the beveling is arranged at least substantially in parallel to the rotational axis.

2. The radially conveying stirring device according to claim 1, wherein, viewed in a direction of the rotational axis, a main extension direction of the stirring blade includes an angle with the half-line that is between 45° and 135°.

3. The radially conveying stirring device according to claim 1, wherein the carrier arm is arranged at least substantially at mid-level of the stirring blade.

4. The radially conveying stirring device according to claim 1, wherein a main extension length of the stirring blade sections decreases from a stirring blade inner edge of the stirring blade towards a stirring blade outer edge of the stirring blade.

5. The radially conveying stirring device according to claim 1, wherein a blade height of the stirring blade decreases towards a stirring blade outer edge of the stirring blade.

6. The radially conveying stirring device according to claim 1, wherein, in a proximity of a stirring blade inner edge of the stirring blade, a blade height of the stirring blade is equivalent to a value between 1% and 30% of an entire stirring element diameter.

7. The radially conveying stirring device according to claim 1, wherein, in a proximity of a stirring blade outer edge of the stirring blade, a blade height of the stirring blade is equivalent to a value between 0.5% and 15% of an entire stirring element diameter.

8. The radially conveying stirring device according to claim 1, wherein the stirring element hub, the carrier arm and the stirring blade are embodied at least partly in a one-part implementation with each other.

9. A radial stirring element with a radially conveying stirring device according to claim 1.

10. A stirring system with at least one container and with at least two radial stirring elements according to claim 9, which are arranged in the container.

11. A method for operating a stirring system according to claim 10, wherein a middle-to-highly viscous medium arranged in a container is mixed in such a way that an axial flow is at least substantially suppressed.

12. The method for operating a stirring system, according to claim 11, wherein a plug flow is generated in the container.

* * * * *